UNITED STATES PATENT OFFICE.

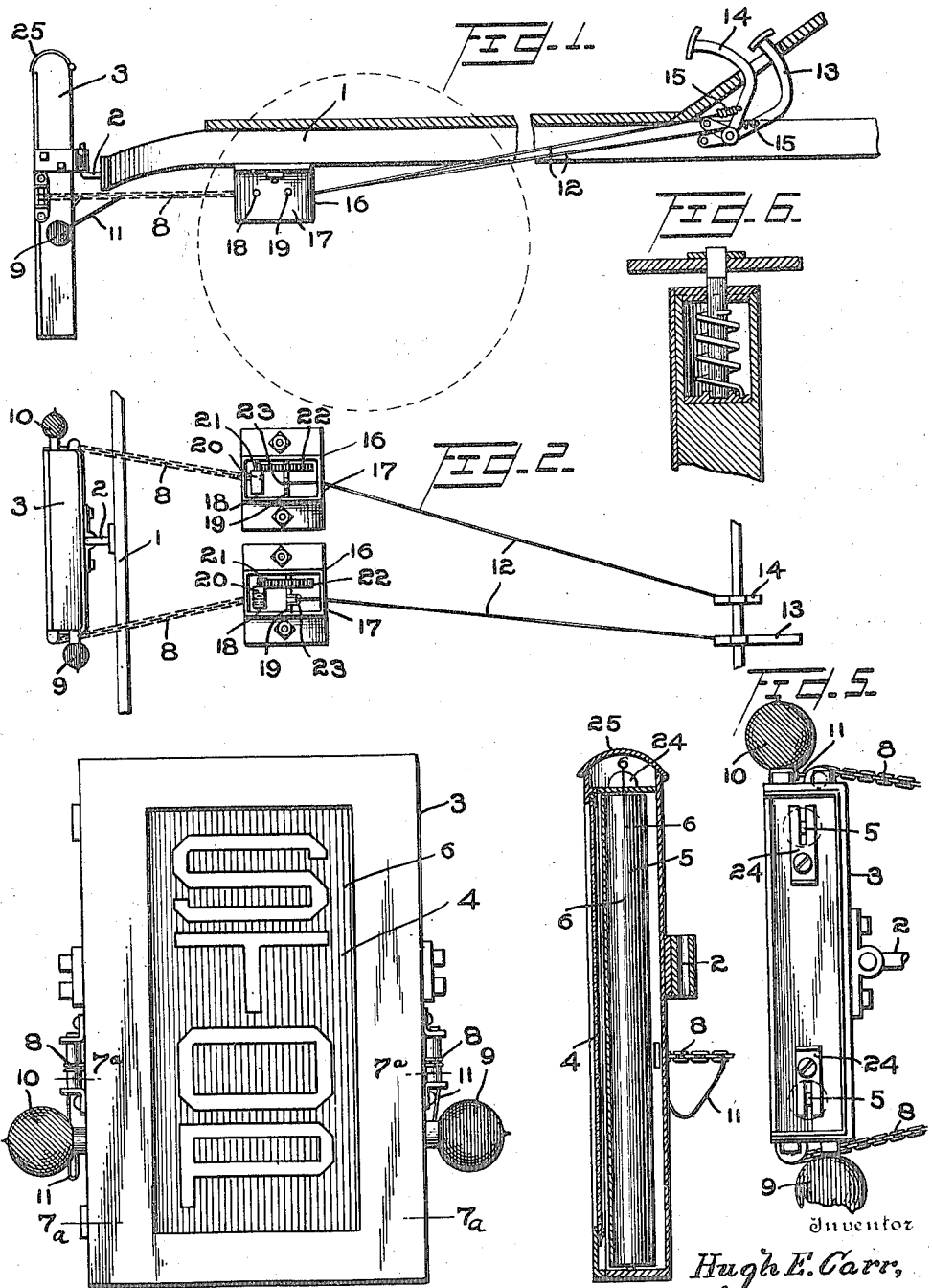

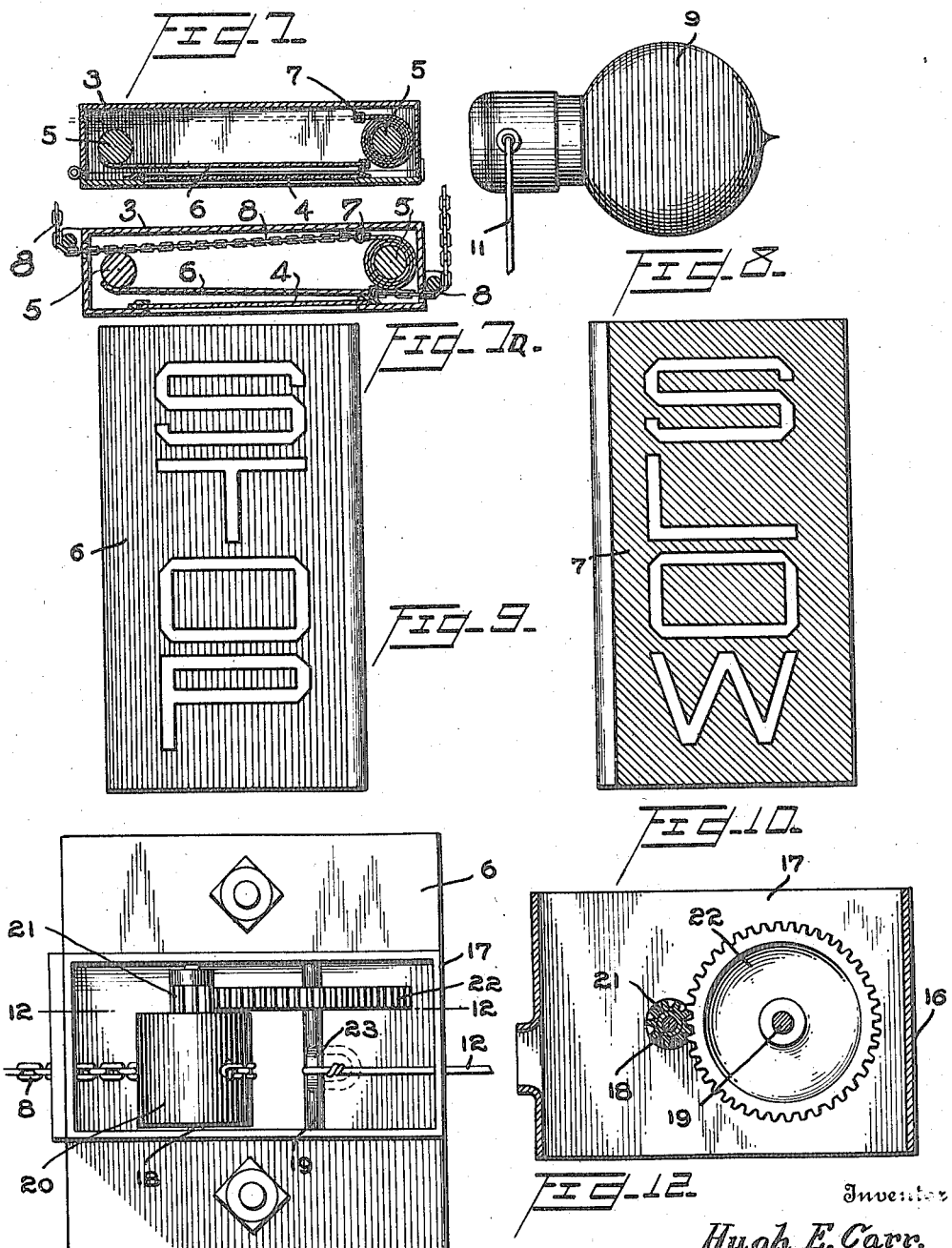

HUGH E. CARR, OF WALLINGFORD, PENNSYLVANIA.

SIGNALING MECHANISM FOR VEHICLES.

1,123,845. Specification of Letters Patent. Patented Jan. 5, 1915.

Application filed March 11, 1913. Serial No. 753,497.

*To all whom it may concern:*

Be it known that I, HUGH E. CARR, a citizen of the United States, residing at Wallingford, in the county of Delaware and State of Pennsylvania, have invented certain new and useful Improvements in Signaling Mechanism for Vehicles, of which the following is a specification.

My invention relates to improvements in signaling mechanism for vehicles, the object of the invention being to provide an improved signaling device located at the rear of the vehicle, and operated by and simultaneously with the clutch throwing lever and the brake levers, so as to operate curtains and lights to indicate to a vehicle in the rear exactly what the chauffeur or driver of the vehicle in front is doing.

A further object is to provide improved mechanism of this character which comprises curtains containing the words "Stop" and "Slow" respectively, together with electric lights, said lights and curtains colored, so that at night the lights will indicate with their color what the curtains do during the day.

A further object is to provide a signaling mechanism of this character which may be readily attached to any automobile or similar vehicle, which will be neat and attractive in appearance, and which will be strong and durable in use.

With these and other objects in view, the invention consists in certain novel features of construction and combinations and arrangements of parts as will be more fully hereinafter described and pointed out in the claim.

In the accompanying drawings: Figure 1 is a broken view in longitudinal section illustrating my improvements attached to a vehicle frame. Fig. 2 is a plan view with the frame broken away for clearness. Fig. 3 is a view in elevation of the signaling device. Fig. 4 is a view in longitudinal section through the center of the signaling device. Fig. 5 is a plan view of the signaling device with its cap or cover removed. Fig. 6 is a fragmentary view in longitudinal section of one of the spring rollers in the casing of the signaling device. Fig. 7 is a view in horizontal section through the signaling device on the line 7—7 of Fig. 3. Fig. 7$^a$ is a view in cross section on the line 7$^a$—7$^a$ of Fig. 3. Fig. 8 is a view of one of the electric lamps. Figs. 9 and 10 are views in elevation of the two curtains. Fig. 11 is a plan view of one of the power transmission mechanisms, and Fig. 12 is a view in section on the line 12—12 of Fig. 11.

While my improvements are adapted for use on various forms of automobile, I have not attempted to indicate any particular style, but have shown diagrammatically in Fig. 1, an automobile frame 1 having a bracket 2 at its rear end supporting my improved signaling device 3. This signaling device comprises a rectangular casing containing a transparency 4 in its rear wall, and supporting two vertically positioned spring rollers 5. These rollers are located in the casing at the sides of the transparency 4, so that they are not observed and they contain curtains which for convenience of description I have given separate reference numerals, one curtain 6 is preferably red in color, and contains the word "Stop." The other curtain 7 is preferably green in color, and contains the word "Slow." These curtains are connected at their free ends to chains 8 which are adapted when moved longitudinally in one direction to draw the curtains across the transparency 4 and expose the word on the curtain.

On the sides of the signaling device, two electric lights 9 and 10 respectively are located. The globes of these lights are also colored, the globe 9 being red and the globe 10 green.

Short flexible devices 11 connect switch mechanism in the lamps, so that when a curtain is operated, its properly colored lamp will be automatically illuminated because the circuit will be closed when the chain 8 is drawn longitudinally.

I have not attempted to illustrate the particular construction of this switch, but it is to be understood that it will be spring held and normally open and only closed when the flexible device 11 is drawn taut, the latter being normally slack as indicated in Fig. 4.

The chains 8 are operated by flexible devices 12, one being connected to the brake lever 13, and the other to the clutch lever 14, coiled springs 15 being preferably provided in the flexible devices 12 to compensate for excessive movement of the lever. Ordinarily these levers move but a relatively short distance not sufficient to give the curtains 6 and 7 their necessary movement. To provide this additional movement, I utilize transmission means 16 which are interposed between the flexible devices 12 and the chains 8. These transmission means each comprise a casing 17 secured to the frame 1 in any approved manner. In each casing 17, two parallel shafts 18 and 19 are located. A drum 20 on shaft 18 winds thereon a chain 8, and on this shaft 18, a relatively small pinion 21 is secured and is driven by a relatively large gear 22 on shaft 19.

The flexible device 12 is connected to a crank arm 23 on shaft 19, so that while this shaft 19 is turned but a partial revolution, the gear 22 and pinion 20 will cause the drum 18 to revolve, and give to the chain 8, the necessary movement.

It will thus be seen that the transmission mechanism may be so geared as to give the curtain any desired movement regardless of the length of movement of the lever.

It is desirable to so mount the spring rollers 5 that they may be removed and with this end in view, I provide slotted bars 24 in the top of casing 3 which receive the angular ends of the roller trunnions.

A hood 25 normally covers the upper end of the signaling device, and acts as a watershed.

In operation, when the chauffeur moves the clutch throwing lever 14, this movement imparts to the curtain 7, a sufficient movement to draw that curtain across the transparency 4, so as to show the word "Slow." At the same time, the green light 10 is illuminated, so that the signal applies equally well at night as during the day.

Whenever a car slows down, the clutch lever is thrown out, hence the operation of signaling is entirely automatic and works in unison with the lever. When the car is brought to a stop, it is necessary to apply the brake lever. When this is done, the curtain 6 is drawn across the transparency 4 to show the word "Stop." At the same time, the red light 9 is illuminated.

It will thus be seen that with my improvements, whether at night or during the day, the ordinary operation of the car will signal to a vehicle in the rear just what the driver or chauffeur of the car is doing, thereby preventing accidents and dispensing with the necessity for manually operated signaling means.

My improvements may be attached to any ordinary car.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A signaling mechanism for automobiles, comprising a casing adapted to be secured to an automobile and having an opening in its rear face, two spring rollers vertically positioned in the casing parallel to each other and located at opposite sides of the said opening, whereby the rollers are hid from view, slotted bars secured to the top of the casing and engaging flattened trunnions of the rolls, a hood secured over the upper end of the casing and covering the slotted bars, signaling curtains on said rollers, and flexible operating devices for said curtains extending through the end walls of the casing, substantially as described.

In testimony whereof I have signed my name to this specification in the presence of two subscribing witnesses.

HUGH E. CARR.

Witnesses:
C. R. ZIEGLER,
S. W. FOSTER.